United States Patent [19]
Francois et al.

[11] Patent Number: 5,936,155
[45] Date of Patent: Aug. 10, 1999

[54] DEVICE AND PROCESS FOR MONITORING THE CONDITION OF THE TIRES AND THE TEMPERATURE OF THE BRAKES

[75] Inventors: Jean-Pierre Francois, Romagnat; Gilbert Pellizzaro, Gerzat; Xavier Tromeur, Artonne, all of France

[73] Assignee: Campagnie Generale des Etablissements Michelin, France

[21] Appl. No.: 08/999,697

[22] Filed: Sep. 17, 1997

Related U.S. Application Data

[63] Continuation of application No. 08/506,745, Jul. 26, 1995, abandoned.

[30] Foreign Application Priority Data

Aug. 1, 1994 [FR] France .................................. 94 09612

[51] Int. Cl.⁶ .................................................. G01M 17/02
[52] U.S. Cl. ........................... 73/129; 73/146; 73/146.5; 374/154; 340/448; 340/449; 340/453
[58] Field of Search .................................... 73/129, 146.2, 73/121, 128, 146, 146.3–146.5, 146.8; 340/448, 449, 453, 870.16, 870.17, 870.31, 870.38, 442–446, 454; 374/141–143, 152–154

[56] References Cited

U.S. PATENT DOCUMENTS

| | | | |
|---|---|---|---|
| 2,575,922 | 11/1951 | Langenwalter . | |
| 3,852,717 | 12/1974 | Hasaka et al. | 340/449 X |
| 3,881,170 | 4/1975 | Hosaka et al. | 340/448 |
| 4,052,696 | 10/1977 | Enabnit | 73/146.5 X |
| 4,148,008 | 4/1979 | Lusk et al. | 340/448 |
| 4,180,795 | 12/1979 | Matsuda et al. | 340/448 |
| 4,355,297 | 10/1982 | Sinha et al. | 73/146.2 X |
| 4,703,650 | 11/1987 | Dosjoub et al. | 73/146.5 |
| 4,737,761 | 4/1988 | Dosjoub et al. | 73/146.5 X |
| 4,758,969 | 7/1988 | André et al. | 340/442 X |
| 5,029,468 | 7/1991 | Dosjoub | 73/146.5 |
| 5,050,110 | 9/1991 | Rott | 73/146.2 X |
| 5,071,259 | 12/1991 | Metzger et al. | 73/146 X |
| 5,189,391 | 2/1993 | Feldmann et al. | 73/129 X |
| 5,193,387 | 3/1993 | Hodate | 73/146.5 |
| 5,228,337 | 7/1993 | Shorpe et al. | 73/146.5 |
| 5,274,355 | 12/1993 | Galan | 340/449 X |

FOREIGN PATENT DOCUMENTS

| | | |
|---|---|---|
| 25 22 556 | 12/1976 | Germany . |
| 38 13 494 A1 | 11/1989 | Germany . |
| 39 41 509 A1 | 6/1990 | Germany . |
| 40 06 885 A1 | 10/1990 | Germany . |
| 2108304 | 5/1983 | United Kingdom ................. 340/449 |
| 2874 | 2/1993 | WIPO ................................. 73/146.5 |

OTHER PUBLICATIONS

Patent Abstracts of Japan Grp P1103, vol. 14, No. 419 "Warning Apparatus for Pressure–Reduction of Inner Pressure of Tire" Hodate Abs pub. date Sep. 10, 1990 (2–162222).

*Primary Examiner*—Thomas P. Noland
*Attorney, Agent, or Firm*—Alan A. Csontos; Robert R. Reed

[57] ABSTRACT

A device and process for monitoring the condition of the tires of a vehicle and of their environment is disclosed. The device uses a central unit and a wheel module with at least one measuring sensor for each wheel. The module is electrically connected to a rotating antenna firmly attached to the hub of the wheel, as well as a stationary antenna firmly attached to the hub housing of the wheel and connected to the rotating antenna. The stationary antenna is electrically connected to the central unit for transmitting to the driver the results of the measurements and/or an alarm if an abnormal condition of the tires is detected and the antennae being laid out in the environment of the braking mechanisms of the wheel and characterized in that it includes a sensor for estimating the temperature of the braking mechanism. The sensor includes one of the antennae being sensitive to variations in temperature.

3 Claims, 3 Drawing Sheets

DEVICE AND PROCESS FOR MONITORING THE CONDITION OF THE TIRES AND THE TEMPERATURE OF THE BRAKES

This is a continuation of application Ser. No. 08/506,745 filed on Jul. 26, 1995 now abandoned.

BACKGROUND OF THE INVENTION

The present invention concerns a device and process for monitoring the condition of the tires of a vehicle as well as of their environment, particularly the temperature of the braking mechanisms.

Numerous known devices for monitoring the condition of the tires of a vehicle are not content with activating an alarm when the pressure of one of the tires is lower than a given threshold, but transmit continuously to a central unit connected to a display device situated close to the driver the internal pressure of the tires as well as, for some of them, the internal temperature of the said tires. Such a device is described, for example, in the application WO89/05737.

Intensive usage of the brakes or defective functioning of the brakes leads to very significant heat build-up of the braking mechanisms in friction (disk-caliper or drum-brake shoes). This heat build-up can lead directly to serious damage to the braking. On the other hand, this heat build-up is transmitted to all of the mechanical parts located near these braking mechanisms and particularly to the tires through their rims. Consequently, the heat build-up of the braking mechanisms disturbs the measurements of inflation pressure and temperature done by the systems for monitoring the condition of these tires, but also can be the cause of thermic fatigue of the parts of the tires in contact with the rims.

It is therefore very important to be able to detect an abnormal heat build-up of these braking mechanisms. U.S. Pat. No. 5,050,110 proposes, in order to correct the errors due to heat build-up of the braking mechanisms, to situate near these braking mechanisms a temperature sensor as a complement to those which measure the internal temperature of the tires. This device can, of course, detect an abnormal heat build-up of the braking mechanisms. But, it requires increasing the number of sensors of measurement in the vehicle, which is costly.

SUMMARY OF THE INVENTION

The subject of the invention is a device and process for monitoring the condition of the tires of a vehicle as well as the temperature of the brakes which does not require increasing the number of sensors of measurement.

In that which follows, "hub" is used to mean the rotating hub of the wheel itself, as well as any other rotating part which is attached to it, such as the counting wheel of a wheel anti-locking system (A.B.S.), joint rotating parts, etc.; and "hub housing" is used to mean the hub housing of the wheel itself, as well as any non-rotating part which is attached to it, such as the oil catcher, A.B.S. sensor holder, etc.

Also, "wheel" is used to mean the assembly comprised of the two wheels placed one against the other during mounting of dualed tires as well as an ordinary wheel during mounting of a single tire.

Finally, "environment of the braking mechanisms" is used to mean all of the mechanical parts situated near the braking mechanisms whose temperature is significantly a function of the heat build-up of these braking mechanisms because of direct thermic transfers.

The monitoring device, according to the invention, is comprised of a central unit and for each wheel at least one sensor of measurement connected by primary means of electrical connection to a rotating antenna firmly attached to the hub of the wheel as well as a stationary antenna firmly attached to the hub housing of the said wheel and connected to the said rotating antenna, said stationary antenna being connected by secondary means of electrical connection to the said central unit, said antennae being situated in the environment of the braking mechanisms of the said wheel and the said central unit transmitting to the driver the results of the measurements and/or an alarm if an abnormal condition of the tires is detected. This device is characterized in that it includes the means for estimating the temperature of the said braking mechanisms, said means including at least one of the said antennae sensitive to variations of temperature.

This device has the advantage of not requiring installation of any additional sensor for measurement of temperature in order to make an estimate of the temperature of the braking mechanisms.

Favorably, at least one of the antennae includes a coil of conductor wire whose electrical resistance varies with the temperature and the temperature of the said braking mechanisms is estimated through measurement of the electrical resistance of this coil.

This measurement can be conducted as follows according to the measurement process of the present invention:
 a continuous electrical current is passed into the said coil;
 the difference of potential is measured between the two extremities of the said coil;
 the electrical resistance of the said coil is calculated;
 the average temperature of the said coil is deduced by referring to an initial calibration chart;
 the temperature of the braking mechanisms is estimated by referring to a second calibration chart.

Preferably, the measurement of temperature is done cyclicly between two phases of transfer by inductive coupling. This has the advantage of not introducing auto-heat build-up in the coil of the antenna.

When the temperature of the braking mechanisms is higher than a given threshold, an alarm is transmitted to the driver. This threshold can be determined experimentally.

BRIEF DESCRIPTION OF THE DRAWINGS

An example will be described of implementing the given invention in a non-limitative way, by referring to the following attached figures.

DETAILED DESCRIPTION OF THE PREFERRED EMBODIMENT

Figure 1:
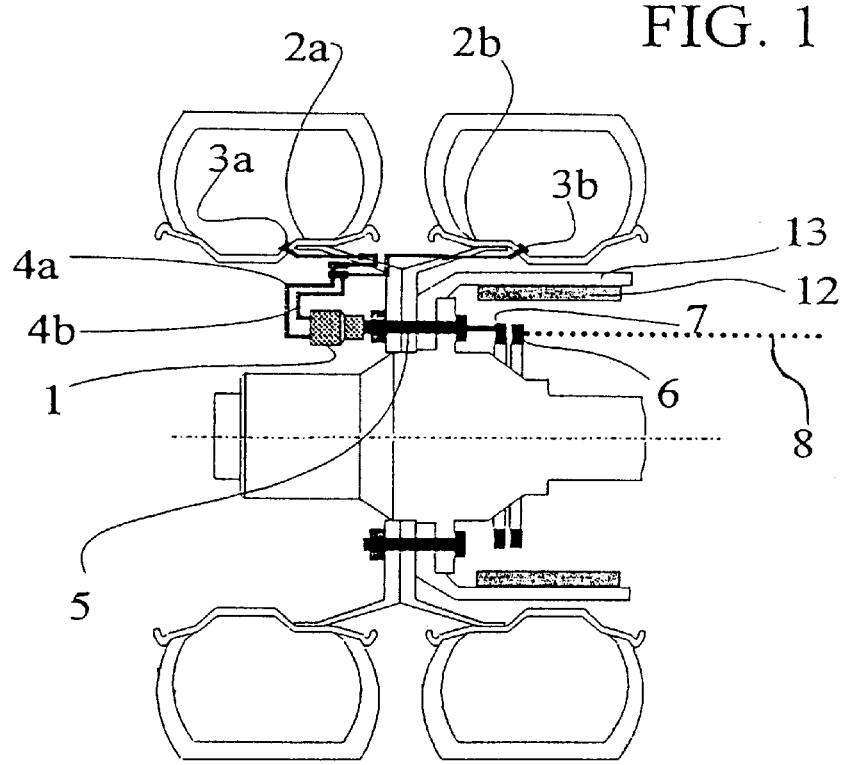
FIG. 1 is a partial cross-section passing through the axle of the wheels of an assembly of two dualed wheels, their hub and brake drum, and a preferred embodiment of the device of the present invention.

FIG. 1 illustrates the installation of a preferred embodiment of the device for monitoring the condition of the tires of a vehicle on one wheel of the rear axle of a truck tractor equipped with drum brakes.

A wheel module 1 is attached to the extremity of one of the attachment bolts 5 of the dualed wheels 2a and 2b. The wheel module 1 is attached to valves 3a and 3b by pneumatic connections 4a and 4b. The wheel module 1 is also attached to a central unit 9 (FIG. 2) by means of electrical connections which include:

- electrical conductors crossing bolt 5 as far as a rotating antenna 7,
- an inductive coupling element comprising the rotating antenna 7 and a stationary antenna 6;
- an electrical connection between the stationary antenna 6 and the central unit 9 using the electrical line 8 of the vehicle.

"Stationary" antenna is used to mean an antenna firmly attached to the non-rotating hub housing 14 of the axle of the wheel 2.

The two antennae are situated in the environment of the braking mechanisms comprised of the brake drum 12 mounted on the inside of the housing 13.

Figure 2:
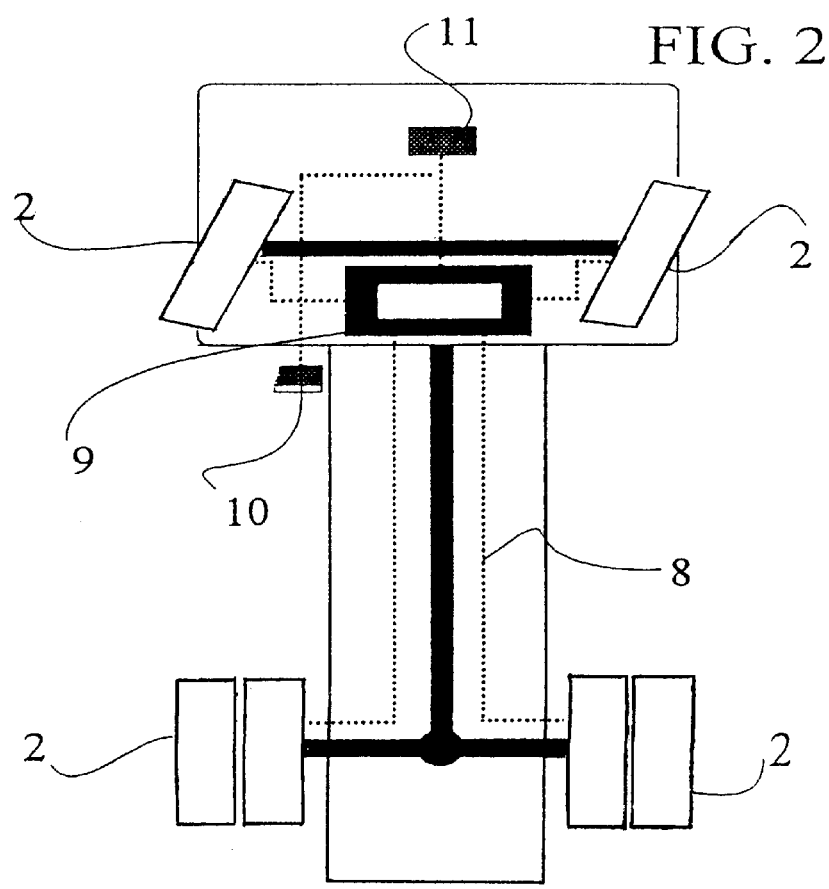
FIG. 2 is an installation diagram of the device for monitoring tires applied to a truck tractor.

FIG. 2 presents a general diagram for installation of the monitoring device on a truck tractor. Each wheel 2 of the tractor is equipped as just described, the device also consists of:

- the central unit 9; in the case of trailers, this central unit is supplied with power by the towing vehicle through the normalized plug 10 connecting the electrical line of the trailer to that of the tractor;
- a means of alarm 11 for the driver connected to the said central unit 9.

The wheel module 1 is composed of a sensor for measuring the inflation pressure and, preferably, a sensor for measuring the air temperature of the tires. These sensors have two paths of measurement when they are mounted on an assembly of two dualed wheels. The module also includes the necessary electronics for storing the electrical energy required for its excitation transmitted by the central unit 9, for coding and transmitting the measurements to the central unit 9. Such a module is described in applications WO87/00127, WO87/00129 and WO89/05737.

Figure 3:
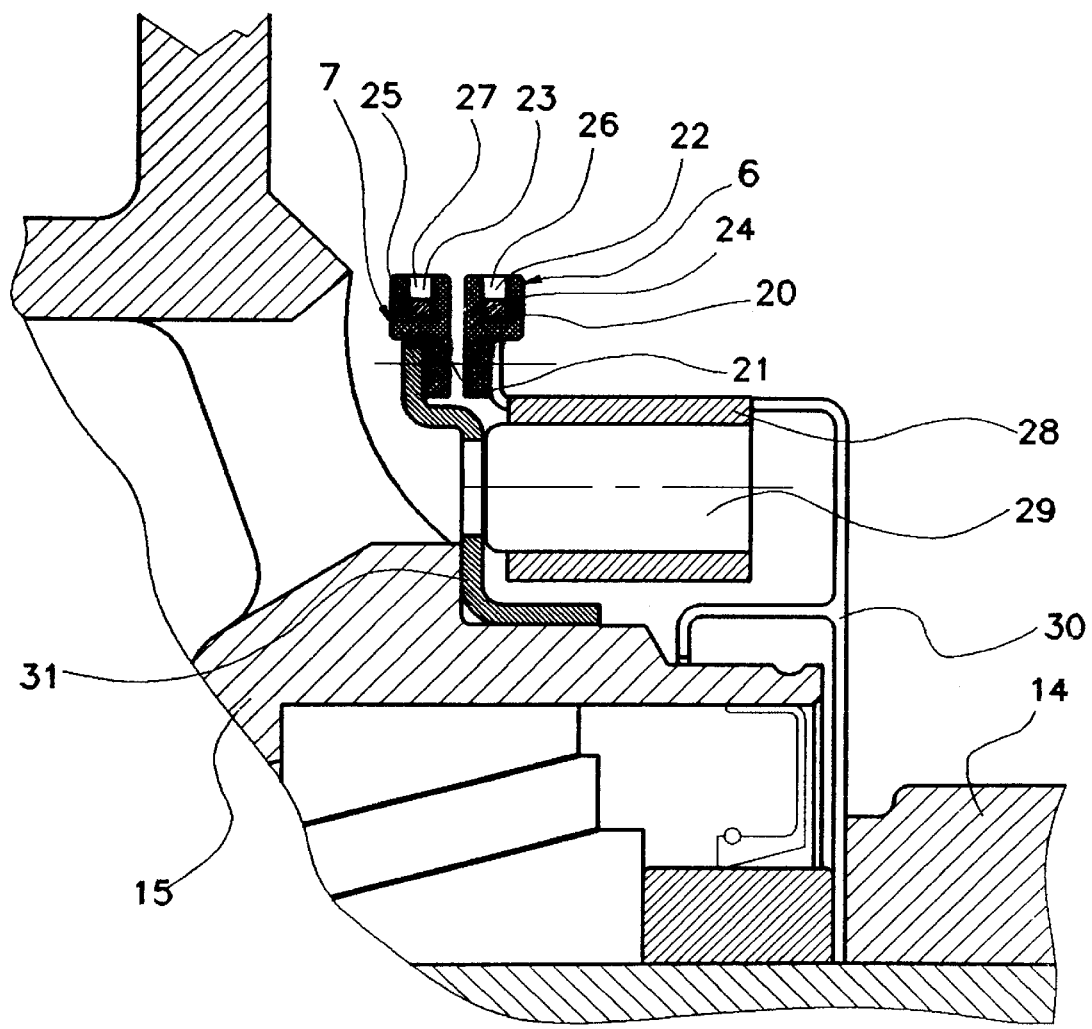
FIG. 3 is an enlarged elevational view of a portion of the assembly shown in FIG. 1 concerning installation of the stationary and rotating antennae in the case of an axle equipped with an wheel anti-locking sensor.

FIG. 3 presents an example of installation of the two antennae, one stationary 6 and one rotating 7, in the environment of the braking mechanisms of an axle equipped with a wheel anti-locking sensor.

The two antennae include a holder 20, 21 of straight section in the shape of "$\mu$" whose axis of revolution is joined with that of the axle, a cavity 22, 23 between the upper bars of the "$\mu$"; in the cavity 22, 23 is wound a coil 24, 25 of conductor wire then a protective resin 26, 27.

The holder 20 of the stationary antenna 6 is attached to a holder 28 of a wheel anti-locking sensor 29, the holder 28 being itself firmly attached to an oil catcher 30 attached to the stationary hub housing 14. The holder 21 of the rotating antenna 7 is attached to the counting wheel 31 being itself firmly attached to the rotating hub 15.

The invention can be implemented by using either the stationary antenna 6, or the rotating antenna 7, or both to estimate the temperature of the braking mechanisms.

The coil of the stationary antenna can be made with a copper wire of diameter 16/10 mm. For a wire length of 58 m, the resistance of the antenna is 50Ω at 20° C. and 104Ω at 300° C., considering the resistance of copper equal to 1.724 $\mu$ohm.cm, and the coefficient of temperature $\beta$ of 0.00393. In a temperature range of −40 to 300° C., the variation of resistance of the coil of the stationary antenna will therefore be about 66Ω.

These values of electrical resistance are compatible with the values of inductance required for good electromagnetic connection between the antennae.

Figure 4:
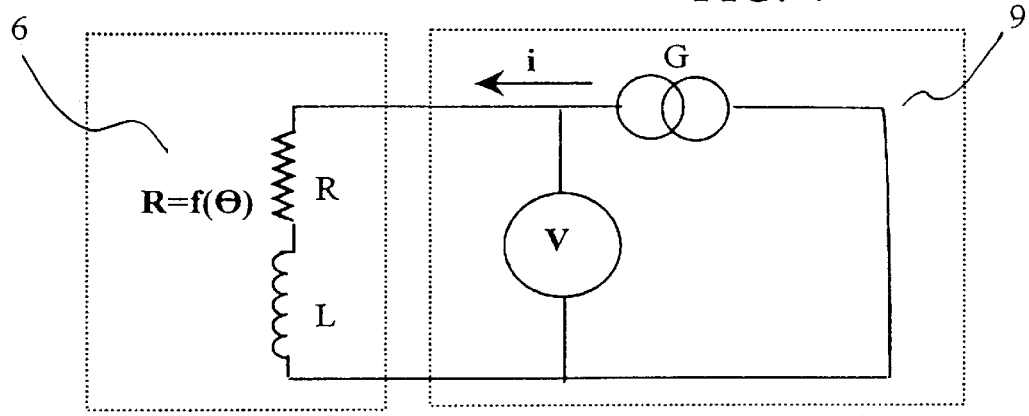
FIG. 4 presents a diagram of the temperature measurement circuit.

The diagram in FIG. 4 illustrates the circuit for measuring the electrical resistance of the coil of the stationary antenna 6.

The antenna is represented by a resistance R in series with an inductance L. The central unit 9 includes a generator of continuous current G and a voltmeter of measurement V. The circuit for measurement includes, in series, the coil of the antenna (R and L) and the generator of current G, and it includes the voltmeter V connected in parallel to the two extremities of the coil 24 of the stationary antenna 6.

A continuous current I is introduced by the generator of current G into the circuit. Then the voltmeter V measures the difference of potential U between the two terminals of the coil 24 of the conducting wire of the antenna. The ratio U/I gives the value of the resistance of the coil R. Using a calibration chart, the temperature of the antenna can thereby be obtained. The estimate of the temperature of the braking mechanisms can then be done by referring to a second calibration chart.

To avoid auto-heat build-up of the coil 24 of the antenna 6, it is preferable to limit the intensity of current I to low values. A value of about 10 mA seems a good compromise. Also, for the same purpose, the measurements can be done in a cyclical manner between two phases of transfer of signals between the wheel modules 1 and the central unit 9.

In using these measurements of temperature of the braking mechanisms, it is advantageous to plan for transmission of an alarm to the driver when this temperature exceeds the given threshold determined experimentally.

The rotating antenna 7 can also be utilized alone, or as a complement to the stationary antenna 6, to estimate the temperature of the braking mechanisms.

In this case, the measurement of the electrical resistance of the coil 25 of the rotating antenna 7 is done in the same manner as for the stationary antenna 6. The electrical energy used is that which is transmitted by the central unit 9 through inductive coupling according to the instructions in application WO87/00129. The wheel module 1 should then include the necessary means for measuring the temperature of the coil 25, for coding this measurement and transmitting it to the central unit according to, for example, the sequence presented in FIG. 5.

Figure 5:
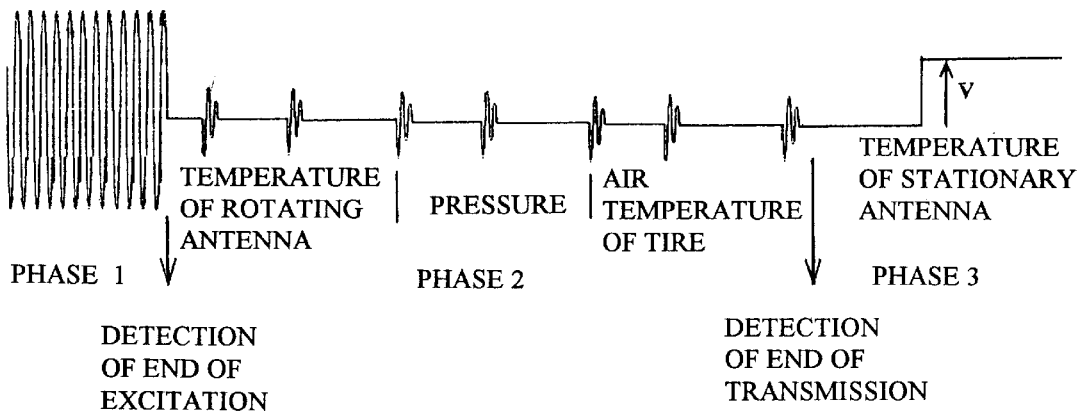
FIG. 5 shows a cycle of measurements in the case of using a rotating antenna as well as possibly a stationary antenna to measure the temperature.

FIG. 5 presents a dialogue cycle between the central unit 9 and the wheel module 1.

This cycle is broken down as follows:

phase 1: transmission of energy from the central unit 9 to the wheel module 1;

detection of the end of the transmission of energy;

phase 2: transmission of measurement impulses;
- transmission of coded measurements of the temperature of the rotating antenna;
- transmission of coded measurements of the inflation pressure;
- transmission of coded measurements of temperature;

detection of the end of transmission of measurement impulses;

phase 3: wheel module 1 at rest.

The measurement of the temperature of the stationary antenna 6 can occur during this last resting phase of the wheel module 1.

The preceding description concerned a vehicle equipped with drum brakes, but the invention can also be implemented in the case of axles equipped with disc brakes or antennae located at any position of the environment of the braking mechanisms.

We claim:

1. A device for monitoring the condition of wheel-mounted tires of a vehicle and of their braking mechanism comprising:
- a central unit; and
- for each wheel:
  - a wheel module with at least one sensor of measurement;
  - a rotating antenna attached to a hub of said wheel and electrically connected to said module;
  - a stationary antenna attached to a housing for the hub, inductively coupled with said rotating antenna and electrically connected to said central unit, at least one of the antennae including a coil of conducting wire whose electrical resistance varies with temperature; and means for estimating the temperature of the braking mechanism of said wheel;

wherein:
- a continuous electric current is passed in said coil;
- the difference in potential between the two ends of said coil is measured;
- the electrical resistance of said coil is measured;
- the average temperature of said coil is approximated by referring to a calibration chart; and
- the temperature of said braking mechanism is estimated by referring to a second calibration chart, whereby, if an abnormal condition of said tires or braking mechanism is detected said central unit transmits to a driver of the vehicle the results of the measurements and/or an alarm.

2. The device according to claim 1, where said device measures the temperature cyclically between two phases of transfer by inductive coupling.

3. The device according to claim 2, further compromising an alarm electrically connected to said central unit for said vehicle and wherein said alarm alerts the driver when the temperature of said braking mechanism is higher than a predetermined value.

\* \* \* \* \*